US007938340B2

(12) United States Patent
Anderson et al.

(10) Patent No.: US 7,938,340 B2
(45) Date of Patent: May 10, 2011

(54) SPRAYING DEVICE

(75) Inventors: James Anderson, Hull (GB); Wu Jin, Hull (GB); Simon Woolley, Hull (GB); Ivan Ye, Guangdong (CN)

(73) Assignee: Reckitt Benckiser (UK) Limited, Slough, Berkshire (GB)

( * ) Notice: Subject to any disclaimer, the term of this patent is extended or adjusted under 35 U.S.C. 154(b) by 110 days.

(21) Appl. No.: 12/090,172

(22) PCT Filed: Oct. 13, 2006

(86) PCT No.: PCT/GB2006/003804

§ 371 (c)(1),
(2), (4) Date: Nov. 17, 2008

(87) PCT Pub. No.: WO2007/045827

PCT Pub. Date: Apr. 26, 2007

(65) Prior Publication Data

US 2010/0006672 A1 Jan. 14, 2010

(30) Foreign Application Priority Data

Oct. 18, 2005 (GB) .................................. 0521064.6

(51) Int. Cl.
*B05B 7/32* (2006.01)
*B05B 1/30* (2006.01)
*F16K 31/02* (2006.01)
*F16F 1/08* (2006.01)

(52) U.S. Cl. ................... 239/337; 239/583; 251/129.15; 251/129.21; 267/166.1

(58) Field of Classification Search .................. 239/302, 239/337, 569, 583, 585.1, 585.2, 585.4; 251/82, 251/83, 129.01, 129.15, 129.21; 222/394, 395; 267/166.1
See application file for complete search history.

(56) References Cited

U.S. PATENT DOCUMENTS

| | | | | |
|---|---|---|---|---|
| 1,751,261 | A * | 3/1930 | Wilson | 267/166.1 |
| 3,187,949 | A | 6/1965 | Mangel | |
| 3,974,941 | A | 8/1976 | Mettler | |
| 3,985,333 | A | 10/1976 | Paulsen | |
| 4,310,125 | A | 1/1982 | Novotny | |
| 5,606,992 | A * | 3/1997 | Erickson et al. | 137/596.17 |
| 6,216,925 | B1 | 4/2001 | Garon | |
| 6,419,122 | B1 | 7/2002 | Chown | |
| 2005/0133752 | A1* | 6/2005 | Purvines et al. | 251/129.15 |

FOREIGN PATENT DOCUMENTS

| | | | |
|---|---|---|---|
| DE | 2920824 | A | 3/1980 |
| EP | 0294223 | A | 12/1988 |
| GB | 2248888 | A | 4/1992 |
| WO | 95/19304 | A | 7/1995 |
| WO | 2006/087516 | A | 8/2006 |

OTHER PUBLICATIONS

English Language Abstract for DE2920824 taken from esp@cenet.com, Jan. 3, 1980.

* cited by examiner

*Primary Examiner* — Darren W Gorman
(74) *Attorney, Agent, or Firm* — Norris McLaughlin & Marcus, PA

(57) ABSTRACT

A spraying device for spraying fragrance, pest control composition and/or a sanitizing composition held within a pressurized container, the spraying device comprising a container receiving section (13) and a switching section (10) wherein the switching section (10) incorporates a solenoid switch.

7 Claims, 4 Drawing Sheets

SPRAYING DEVICE

This is an application filed under 35 USC 371 of PCT/GB2006/003804.

This invention relates to a spraying device, particularly, but not limited to, switching means for a spraying device.

Existing spraying devices typically consist of an aerosol container that is held in position beneath a moveable arm. The moveable arm may be controlled by a timer and a motor, whereby at set time intervals, the arm moves and depresses an outlet valve of the aerosol container to cause a spray of material to be ejected from the aerosol container.

Disadvantages arise with this type of device in that the movement of the arm must be carried out with a relatively large amount of force in order to ensure activation of the aerosol container. However, unless tolerances are very tightly controlled then slight lateral movement of an output stem of the aerosol container can result in damage to the aerosol container due to the force exerted by the moving arm. The aerosol container stem can break causing malfunction of the spraying device.

It is an object of the present invention to address the above mentioned disadvantages.

According to one aspect of the present invention there is provided a spraying device for spraying fragrance, pest control composition and/or a sanitising composition held within a pressurised container, the spraying device comprising a container receiving section and a switching section wherein the switching section incorporates a solenoid switch.

Advantageously, the use of a solenoid switch to control a spray device of the substances referred to above provides exceptional output control compared to prior art devices.

The solenoid switch may incorporate a resilient bias, which may be a coiled spring, preferably a spring that is conical in shape, preferably frusto-conical, when in an extended, uncompressed configuration. Preferably, the spring adopts a spiral shape when in a compressed configuration, preferably having a depth, when compressed, of a single turn of the spring.

Advantageously, the use of a conical spring allows self-centering of an armature of the solenoid against which the resilient bias urges. Also, the conical spring compresses to an advantageously thin package, to allow minimisation of an air gap of the solenoid magnetic circuit.

In a preferred embodiment of the present invention, therefore, there is provided a spraying device for spraying fragrance, pest control composition and/or a sanitising composition held within a pressurised container, the spraying device comprising a container receiving section and a switching section wherein the switching section incorporates a solenoid switch which incorporates a coiled spring that is frusto-conical in shape when in an extended, uncompressed configuration, and which is adapted to self-center with respect to an armature of the solenoid against which the spring urges.

Preferably, the resilient bias is located in a recess in the armature, said recess having a depth of approximately the thickness of the resilient bias when compressed.

Preferably, the recess is located at an end of the armature.

The solenoid may incorporate a bobbin element, on or around which a coil of the solenoid may be wound. The bobbin may provide a frame on which a magnetic circuit of the solenoid may be located.

Advantageously, the bobbin provides a leak free design, having openings only an inlet end and an outlet end thereof. Also, the bobbin forms a frame to which other parts of the solenoid may be secured.

Preferably, the bobbin and the magnetic circuit have a seal located there-between, preferably around an exit opening in the sleeve. The seal is preferably deformable or adapted to be deformable during assembly of the switching section. Preferably, the seal is deformed during assembly of the switching section. Preferably, the seal is adapted to deter the egress of fluid from a flow channel of the bobbin, said flow channel preferably being between an armature of the solenoid and an interior of the bobbin. The seal may be ring-shaped.

The magnetic circuit may comprise at least first and second parts. A first part of the magnetic circuit may be U-shaped, preferably being generally square in cross-section. The first part may incorporate an exit opening of the switching section. A second part of the magnetic circuit may be generally a flat end section adapted to close the U-shaped first section. The second part of the magnetic circuit preferably has an opening, preferably a central opening. Preferably, the armature projects into said opening. Preferably, the opening receives a part of the bobbin. Preferably, the second part is thicker than the first part.

Advantageously, the thickness of the second part reduces reluctance of the magnetic circuit.

The second part may be secured to the first part by means of a crimp section, which may be part of the first section.

The first part preferably incorporates a flow-guide in the vicinity of the exit opening. The flow guide may be a groove, which groove may extend away from the opening, preferably both sides of the opening, preferably in order to guide fluid towards the opening. The flow guide may be adjustable, which may be by the flow guide being secured in the first part by interengaging threads. The adjustment may be made to tune the output spray, for example to widen or narrow a spray cone of the device.

The bobbin preferably incorporates an inlet opening into the flow channel of the bobbin. The inlet opening preferably enters the flow channel at a raised section thereof. The raised section is preferably adapted to receive a seal element. Advantageously, the raised section provides a reduced cross-section area against which the seal element is adapted to bear. Preferably the seal element is a floating seal element. Preferably the seal element is retained between the armature and the raised platform section.

The container receiving section is preferably received on or located over the bobbin, preferably at least an element of the container receiving section surrounds the bobbin. Preferably, the container receiving section is substantially coaxial with the bobbin. The container receiving section advantageously isolates the solenoid switch from the action of a user inserting or removing a material container.

Preferably, the seal element is adapted to seal the flow channel at pressures up to approximately 10 bar, preferably approximately 11 bar, preferably approximately 12 bar, preferably approximately 13 bar.

Preferably, the armature is adapted to travel through approximately 0.1 mm to 0.6 mm, preferably approximately 0.18 to 0.45 mm.

Preferably, the switching device is adapted to function with fluids having a viscosity of less than approximately 15 cP, preferably less than approximately 13 cP, preferably less than approximately 11 cP, preferably less than or equal to approximately 10 cP.

Preferably, the coil has approximately 100 to 300 turns, preferably having an Ampere-turn value of approximately 250 to 500 AT preferably approximately 300 to 450 AT.

Preferably, in use, a maximum current to be passed through the coil is approximately 3 A, preferably less than approximately 2 A.

Preferably, the armature has a response time of approximately 7 ms, preferably approximately 5 ms, more preferably 3 ms.

According to another aspect of the present invention there is provided a spraying device comprising a container receiving section and a switching section wherein the switching section includes a solenoid switch having a bobbin element on or around which a magnetic circuit of the solenoid is located.

According to another aspect of the present invention there is provided a spraying device comprising a container receiving section and a switching section wherein the switching section includes a solenoid switch having a bobbin element within which is held a magnetic armature of the solenoid, wherein a seal element is retained between the armature and an inlet part of the bobbin.

All of the features described herein may be combined with any of the above aspects, in any combination.

For a better understanding of the invention, and to show how embodiments of the same may be carried into effect, reference will now be made, by way of example, to the accompanying diagrammatic drawings in which.

Figure 1:
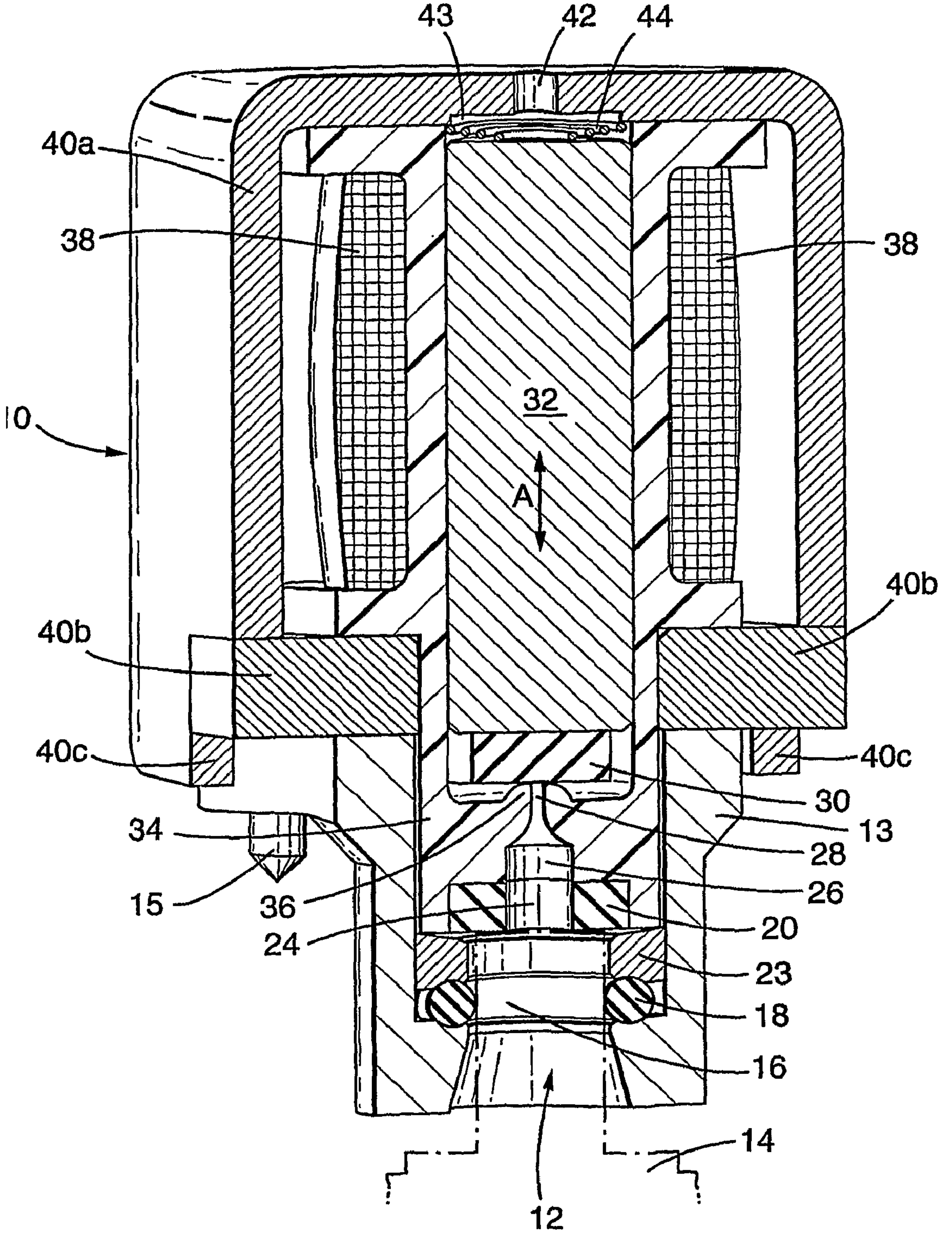
FIG. 1 is a schematic cross-sectional perspective view of a switching section of a spray device.

A switching section 10 of a spray device consists of a solenoid switch as will be described below. An outlet stem 12 of an aerosol container 14 (see FIG. 4) is received in a lower opening 16 of the switching section 10. The valve stem 12 is sealed by means of an O-ring 18 and a face seal element 20. The O-ring 18 and face seal element are separated by a spacer 23. The face seal element has an opening 24 through which material from the aerosol canister 14 may pass. The face seal element 20 gives way to a chamber 26, which tapers to an inlet pin hole 28. The inlet pin hole 28 is sealed by a primary seal element 30, which is held in sealing engagement with the inlet pin hole 28 by a moveable magnetic armature 32.

A plastic bobbin 34 provides a frame on which a number of elements as will be described below are located. The plastic bobbin 34 forms the chamber 26 and the inlet pin hole 28. The inlet pin hole 28 extends through a raised platform section 36, as will be described below.

The moveable magnetic armature 32 is located within the plastic bobbin 34 and can move up and down as will be described below in the direction of the arrow A in FIG. 1. The plastic bobbin 34 also provides a location for copper windings 38 that form part of the solenoid. A magnetic circuit for the solenoid is made by an upper iron frame 40*a*, which is located on the outside of the plastic bobbin 34, and a lower iron frame 40*b* that is in contact with the upper iron frame 40*a*. An iron crimp 40*c* is part of the upper iron frame 40*a* and serves to hold together the upper and lower iron frames 40*a*, 40*b* and the remaining parts of the switching section 10.

Generally, the switching section 10 is a battery powered solenoid valve for controlling spraying of a fluid. The switching section 10 is designed to control the fluid discharge from, for example, aerosol canisters, which are pre-pressurised and fitted with a continuous type discharging valve.

The switching section 10 consists of an intact bobbin housing, with a magnetic circuit energised by batteries (not shown) through the electrical coil winding 38, and an aerosol interface chamber element 13. The bobbin 34 forms a framework of the switching section 10 and also provides a channel for fluid delivery from the aerosol container 14 to an outlet 42 of the switching section 10. The copper coil 38 is wound around the bobbin 34 to provide magnetic energising. The upper and lower iron frames 40*a*, 40*b* are fixed on the plastic bobbin 34 to complete the magnetic circuit. At the bottom of the bobbin 34 there is the pin hole 28, which provides a linking channel between the aerosol interface chamber 26 and the bobbin housing 34.

The primary sealing element 30 forms a flat floating seal between the pin hole 28 and the moveable magnetic armature 32 which forms a plunger. The primary sealing element 30 provides an active pin hole sealing element. In the centre of the upper iron frame 40*a*the outlet hole 42 is located for discharging the fluid in to the surrounding air. A further sealing element 45 surrounding the outlet hole 42 provides a further seal between the bobbin 34 and the upper iron frame 40*a*.

Returning to the base of the switching device in more detail, the opening 16 is part of the aerosol interface chamber element 13 and has a cylindrical shape with a slightly flared opening in order to better receive the stem 12 of the aerosol canister 14. The stem 12 seals against the switching section 10 by means of a face seal with the face seal element 20 at the end of the opening 16 and also an O-ring seal with the O-ring 18, which protrudes inwards slightly from an inner surface of the opening cylinder 16. Both of these seals are provided to prevent contents of the aerosol canister 14 from leaking.

Figure 3:
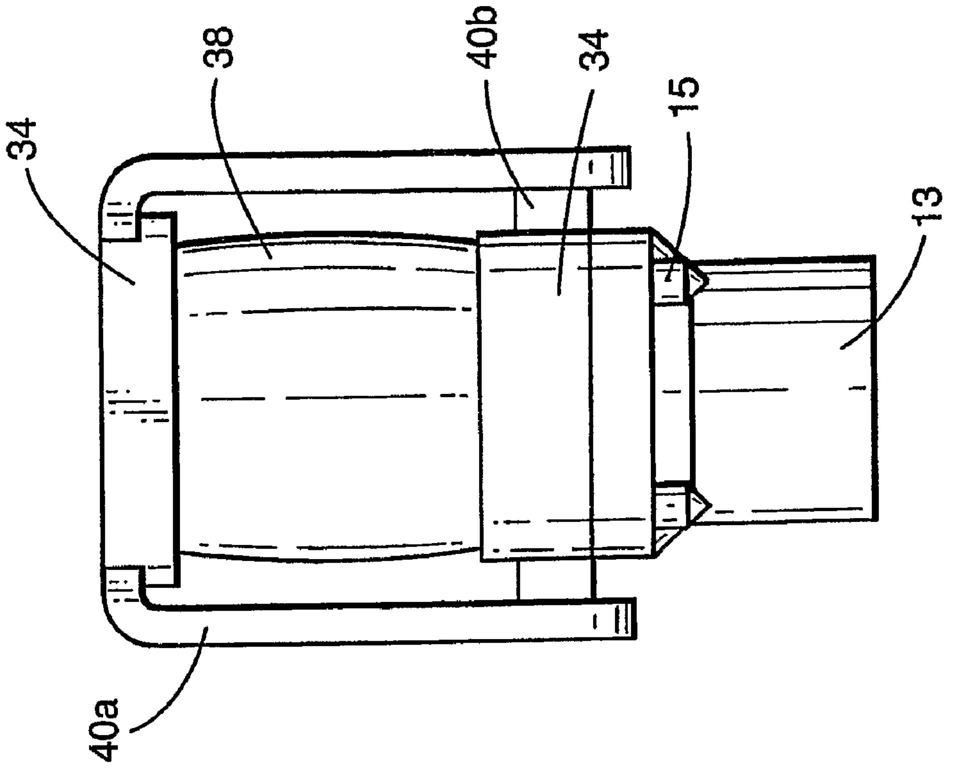
FIG. 3 is schematic front view of the frame and bobbin sections shown in FIG. 2.
Figure 2:
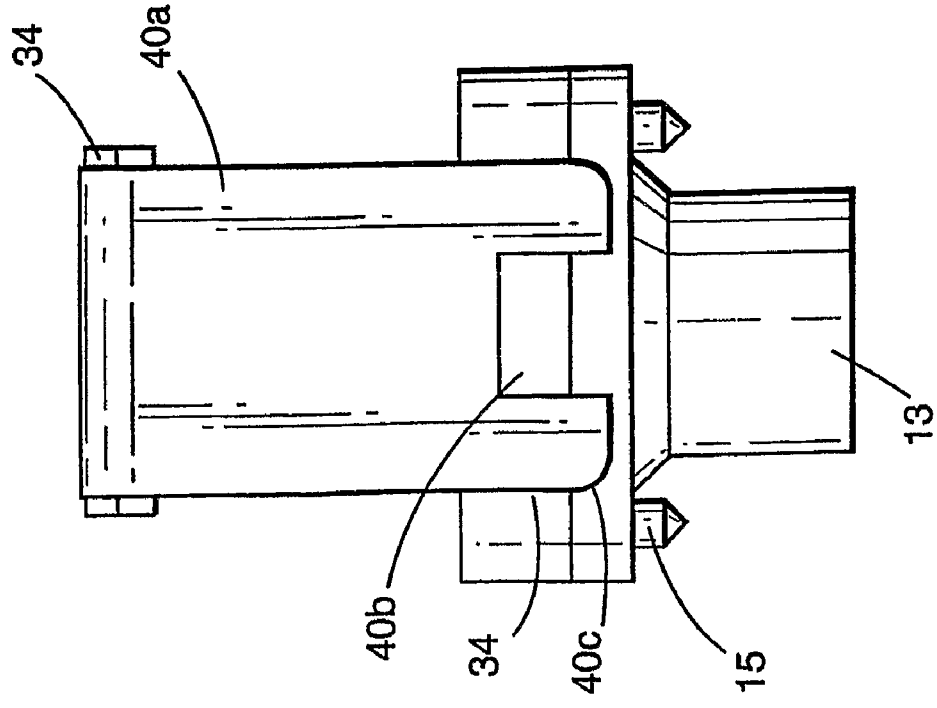
FIG. 2 is a schematic side view of frame and bobbin sections of the switching sections shown in FIG. 1.

The interface chamber is formed by the plastic element 13 that is secured to the bobbin 34 by ultrasonic welding using pegs 15 (see FIGS. 2 and 3) that project through the interface chamber element 13 from the bobbin 34. The projections are arranged at each corner of the square shaped top of the interface chamber element 13. Two of the pegs 15 on opposite diagonal corners are larger than the other two pegs and provide for easy location of the interface chamber element 13 and the bobbin 34. The welding ensures that the lower iron frame 40*b* is secured between the bobbin 34 and the lower interface element 13. The upper and lower iron frames 40*a*, 40*b*, are joined together by crimping as mentioned above, by applying pressure to outer edges of the iron crimp 40*c*, see for example FIG. 2.

In use, the switching section is secured to an aerosol canister 14, with the stem 12 thereof being received in the opening 16 as described above. The aerosol canister 14 has a valve of a continuous discharge type, with the stem 12 being depressed by the switching section 10, meaning that material from the aerosol canister 14 is free to leave the canister into the chamber 26 and up to the primary sealing element 30. Leakage of material from the aerosol canister and out of the opening 16 is prevented by the O-ring 18 and the face seal element 20. The opening 24 in the face seal element 20 allows material from the canister to pass into the chamber 26 and along the inlet pin hole 28 up to the primary sealing element 30. This has the advantage that the switching section 10 controls the discharge completely, rather than the valve of the aerosol canister 14.

Figure 4:
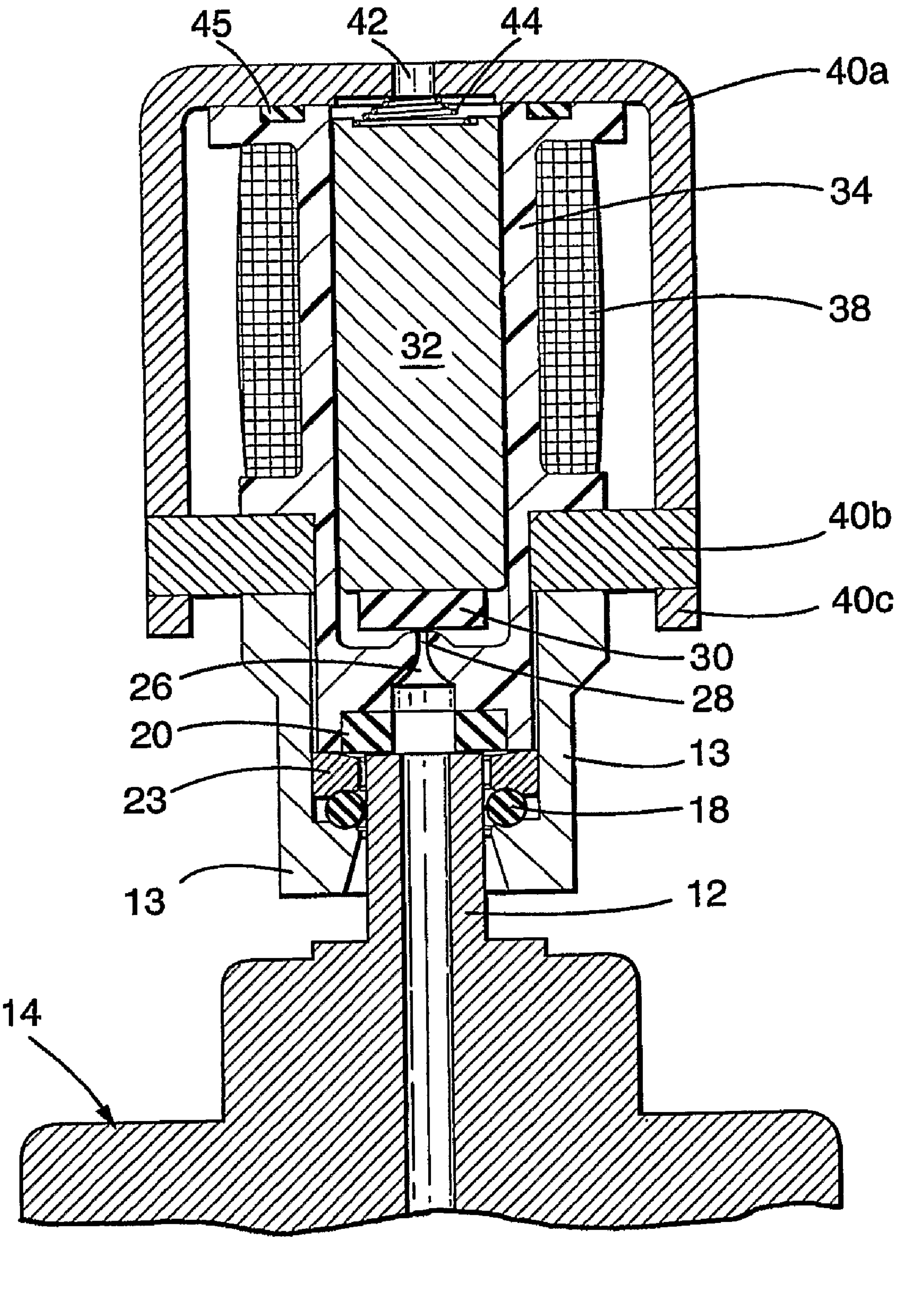
FIG. 4 is schematic cross-sectional view of the switching section in a closed position and having an aerosol canister attached thereto.

The primary sealing element 30 is biased downwards, as shown in FIG. 4, onto the raised platform section 36 by means of pressure from the moveable magnetic armature 32, which in turn is forced downwards by a spring 44, which will be described in more detail below. This configuration is present when no power is supplied to the coil winding 38.

Figure 5:
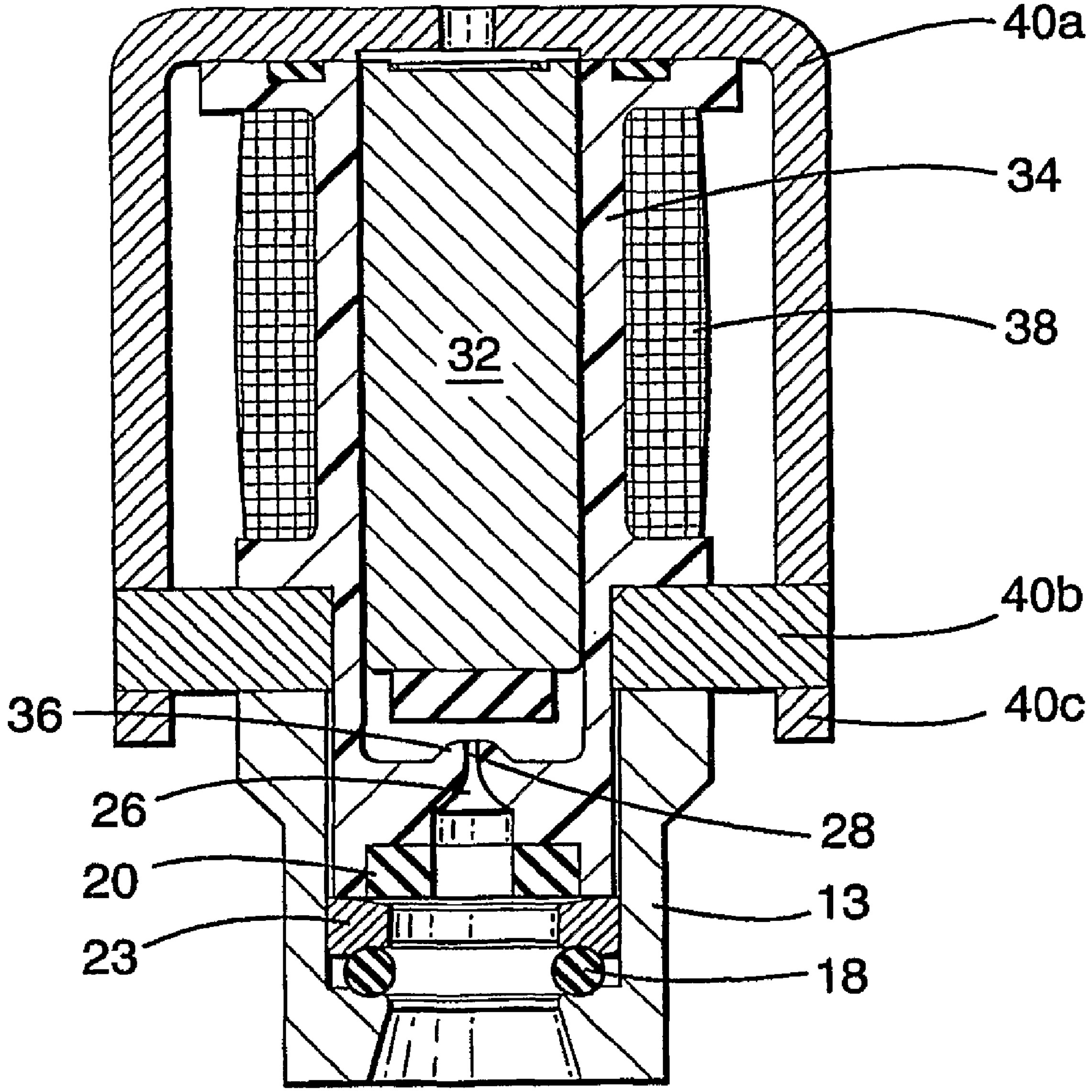
FIG. 5 is a schematic side view of the switching section in an open position.

When a fluid discharge is required from the aerosol canister 14 an electrical current is applied to the coil 38, which results in movement of the moveable magnetic armature 32 due to magnetic induction, to the configuration shown in FIG. 5. The direction of the current in the coil 38 is chosen to cause the moveable magnetic armature 32 to move upwards towards the opening 42 when power is applied. Thus, the primary sealing element 30 is free to move away from the pin hole 28, which allows pressurised fluid from the chamber 26 to pass into the cavity in which the magnetic armature 32 is located, around the sides of the magnetic armature 32 and towards the opening 42 and out into the surrounding atmosphere. Further features of the switching section 10 will now be described in more detail.

The magnetic circuit mentioned above is formed from an upper iron frame 40*a* that is U-shaped. The upper iron frame 40*a* is mated with a flat lower iron frame 40*b* that is generally square except for cut-aways to receive the crimp sections 40*c* (see FIG. 2). The lower iron frame has a central opening in which part of the plastic bobbin 34 is received. The moveable magnetic armature 32 protrudes into the opening in the lower iron frame, in order to complete the magnetic circuit. The lower iron frame 40*b* is designed to be thicker than the upper iron frame 40*a* to minimise reluctance between the two frames 40*a*, 40*b* and the magnetic armature 32. The central opening in the lower frame 40*b* is circular to allow for even flux coupling between the lower frame 40*b* and the magnetic armature 32.

The magnetic materials in the switching section are chosen to ensure that they are compatible with chemicals that will be passing through the switching section 10, given that the magnetic armature 32 has fluid passing up the sides thereof to the exit 42. Also, the materials must have sufficient relative permeability as well mechanical strength and stability. The magnetic materials used are soft iron coated with nickel for the frame sections 40*a,b,c* and magnetic grade stainless steel for the armature 32.

The upper face of the magnetic armature 32 has a central recess 43 in order to receive the spring 44, so that the gap between the armature 32 and the interior face of the upper iron frame 40*a* is minimised.

The design characteristics used in selecting the materials for the winding coil were to provide sufficient electromagnetic force to the armature 32, to be driveable by standard alkaline batteries and to allow for sufficient life of the batteries. Also, the winding must provide sufficiently fast response time and be small in size. The range of design options considered were to use 29 or 30 gauge wire, having approximately 150-250 turns. This provides an ampere turn value of between 300 and 450, with a maximum current of less than 2 amps and a response time of less than 5 ms. Typically, AA type batteries will be used.

The upper iron frame 40*a* incorporates a flow guide channel as described above. The channel allows a flow of material from the aerosol canister 14 around the top of the armature 32 over or through the spring 44 and through the exit opening 42.

The spring 44 is conical in shape when uncompressed and when compressed forms a spiral shape that fits within the recess 43 within the armature 32. The benefit of the conical design is that when compressed, the spring only has a depth of one turn, so that it adds a minimum of extra height. This allows the use of a small recess, which assists in adding only a minimum extra to the total reluctance of the magnetic circuit compared to a larger recess. The diameter of the spring is made smaller than that of the armature 32, which again provides a better magnetic circuit. The spring 44 provides an axial-only motion of the armature 32 and the conical shape provides a self-centering spring which minimises uncertain radial motion of the armature 32. The size of the recess 43 is minimised, which assists in allowing only a small place for undesirable retention of fluid from the aerosol canister 14. However the retention does have some advantage in that some retained fluid will evaporate and leave a saturated pocket of fragranced air meaning that when next activated there will be an initial boost output of the device.

The spring 44 provides in the range of 100-150 gm of force, which, when taking into account the time constant of the spring 44 requires a force of approximately 300 grams to push the armature 32 upwards against the force of a spring in a short response time, such as the less than 5 mm referred to above. The depth of the spring is approximately 2 mm when fully compressed.

As mentioned above, the force of the spring 44 urges the armature 32 downwards and so forces the primary seal element 30 downwards against the raised platform section 36, the latter being frusto-conical in shape. The benefit of having a raised platform section 36 is to provide a smaller surface area against which the primary sealing element 30 should seal. This requires a smaller force from the spring, because less area is effectively being sealed. It has been found advantageous that the sealing pressure of the primary seal against the raised platform section 36 is up to 13 bars. This has benefits of ensuring effective sealing over the entire application pressure range of various types of aerosol canister 14. Also, a failsafe mechanism is provided when an aerosol is overheated. For example, an aerosol may explode when the pressure on the primary seal element 30 were to exceed 15 bars, but of course this would not occur in the present device which would vent excess pressure above 13 bar. Furthermore, minimal power to achieve valve opening is required given the approximately 300 grams of force that is needed. Also, the raised platform section 36 allows the device to be powered by batteries, given the beneficially high sealing pressure that can be achieved with the design described above.

The primary sealing element 30 is designed to float between the bottom of the armature 32 and the raised platform section 35 that forms part of the plastic bobbin 34. The floating design is advantageous in view of the fact that the primary sealing element 30 swells, in 3-dimensions, when put into contact with some chemical propellants used in aerosol canisters 14. Optionally, the resulting deformation may not cause bending of the primary sealing element 30, because the presence of optional protrusions of the plastic bobbin towards the primary sealing element 30. The presence of the protrusions and the corresponding gaps therebetween allows for expansion of the primary seal element 30 into the gaps between the protrusions.

The thickness of the primary element 30 is selected based on the maximum deformation, the required compression rate for sealing, the manufacturing tolerance and also the allowed maximum air gap, defined by the amount of movement allowed for the armature 32. The air gap has a size of between 0.18 mm and 0.45 mm taken at the base of the primary seal element 30. This air gap defines the amount of the travel of the armature 32. The benefits of having an air gap of between the sizes mentioned above is to allow reliable delivery of sufficient amounts of fluid from the aerosol canister 14, to allow for an acceptable seal expansion and compression characteristic, to have sufficiently small amount of movement that the device can be easily powered by batteries, and to allow consistent spray in terms of timing, because a small amount of travel has a more manageable response time.

The inlet pin hole 28 is designed based on the following parameters: aerosol pressure, which is typically between 3 and 10 bars, versus the required sealing force from the primary element; seal hardness must be taken into account based on the compression rate of the sealing element 30 versus the force applied by the spring 44; furthermore, seal tolerance must be taken into account, as must expansion (under chemical attack as mentioned above) versus the thickness of the primary sealing element 30; finally, the spring force from the spring 44 versus the required electrical power to act against that spring force.

The interface chamber 13 provides an element that is separate from the bobbin 34 for the interface of the switching section 10 with the aerosol canister 14. This provides the benefit that the bobbin 34 does not have its operation affected by insertion of an aerosol canister 14; also assembly is more straightforward. Consequently, the stability of the air gap referred to above is maintained. Furthermore, a convenient and reliable means for integration of the switching section 10, using ultrasonic welding and locating pins 15 is achieved. The locating pins 15 are located at four corners of the base of the bobbin 34 and are received in corresponding openings in the aerosol interface chamber element 13. The pins 15 are seen protruding from aerosol interface chamber element 13 in FIG. 1, although the protrusion is not essential. The pins 15 are arranged to have two pins at opposite corners with a slightly larger diameter than the two pins at the other corners. This advantageously allows the aerosol interface chamber element 13 to be located correctly with respect to the bobbin 34.

The provision of a one-piece plastic bobbin 34 has the benefit of a leak free design, because the only exit from the bobbin is at its upper end where exit of material is intended, or the lower end where material passes through the pin hole 28. Also, having a single piece bobbin 34 makes manufacture easier and cheaper. On an upper side of the plastic bobbin 34, a crushable sealing element, in the form of a ring around the top surface of the bobbin 34 is provided. The crushable sealing element crushes against an inner face of the upper part of the upper iron frame 40*a* to prevent material from the aerosol canister leaking sideways and into the area where the coil 38 is located.

The material used for the bobbin 34 is POM, PA (with/without glass fill and PPS), all of which are readily available to the skilled worker. These materials remain mechanically strong and their deformation under the attack of the likely accelerants etc to be included in the aerosol canister is within an acceptable range. Further criteria include temperature stability, dimensional and strength stability in a high humidity environment, as well as a smooth finish and mouldability for production of the pin hole 28.

For the primary seal element 30 material such as Buna®, Viton®, silicon and Neoprene have been used. The design criteria include compatibility with the chemicals likely to be passing the primary sealing element 30, the hardness and hardness change under chemical attack, the force compression rate relation, the maximum dimensional variation under chemical attach and fatigue features under repetitive impacts, as well as temperature stability. The hardness of the materials is chosen as an A grade material in the range of 60-80 degrees on the Shure scale The outlet opening 42 may be provided in the form of a threaded stopper which can be threaded into the upper iron frame 40 to allow for tuning of the air gap by tightening or loosening the stopper to reduce or increase the size of the air gap respectively.

The switching section 10 described herein is for use with typically pressurised material containers, which may be fragrances, pest control substances, sanitising compositions and the like.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A spraying device for spraying fragrance, pest control composition or a sanitising composition held within a pressurised container, the spraying device comprising a container receiving section and a switching section wherein the switching section incorporates a solenoid switch which incorporates a coiled spring that is frusto-conical in shape when in an extended, uncompressed configuration, and which is adapted to self-center with respect to an armature of the solenoid against which the spring urges and wherein the coiled spring is located in a recess present in the armature, the recess having a depth of approximately the thickness of the coiled spring when the coiled spring is compressed.

2. A spraying device as claimed in claim 1 in which the coiled spring adopts a spiral shape when in a compressed configuration.

3. A spraying device as claimed in claim 2 in which the coiled spring has a depth, when compressed, of a single turn of the spring.

4. A spraying device as claimed in claim 1, which further comprises a bobbin element.

5. A spraying device as claimed in claim 4, in which the bobbin element has openings only at an inlet end and an outlet end thereof.

6. A spraying device according to claim 5 wherein the inlet opening of the bobbin enters a flow channel of the bobbin at a raised section thereof, and wherein the raised section is adapted to receive a seal element.

7. A spraying device according to claim 6 wherein the raised section provides a reduced cross-section area against which the seal element is adapted to bear.

* * * * *